(12) United States Patent
Kim et al.

(10) Patent No.: US 9,549,338 B2
(45) Date of Patent: Jan. 17, 2017

(54) METHOD AND APPARATUS FOR TRANSMITTING AND RECEIVING DATA PACKET IN WIRELESS COMMUNICATION SYSTEM

(71) Applicant: Samsung Electronics Co., Ltd., Suwon-si, Gyeonggi-do (KR)

(72) Inventors: Suk-Won Kim, Yongin-si (KR); Jung-Soo Jung, Seongnam-si (KR); Hyun-Jeong Kang, Seoul (KR); Jong-Hyung Kwun, Seoul (KR); Bong-Jhin Shin, Yongin-si (KR); Sung-Jin Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 14/278,591

(22) Filed: May 15, 2014

(65) Prior Publication Data

US 2014/0341023 A1 Nov. 20, 2014

(30) Foreign Application Priority Data

May 15, 2013 (KR) ........................ 10-2013-0055005

(51) Int. Cl.
| | |
|---|---|
| *H04W 28/02* | (2009.01) |
| *H04W 40/12* | (2009.01) |
| *H04L 12/709* | (2013.01) |
| *H04L 12/803* | (2013.01) |
| *H04L 12/801* | (2013.01) |

(52) U.S. Cl.
CPC ........ *H04W 28/0278* (2013.01); *H04L 45/245* (2013.01); *H04L 47/122* (2013.01); *H04L 47/193* (2013.01); *H04W 40/12* (2013.01)

(58) Field of Classification Search
None
See application file for complete search history.

(56) References Cited

U.S. PATENT DOCUMENTS

| | | |
|---|---|---|
| 2005/0073985 A1 | 4/2005 | Heo et al. |
| 2009/0059928 A1 | 3/2009 | Enomoto et al. |

(Continued)

FOREIGN PATENT DOCUMENTS

| | | |
|---|---|---|
| KR | 10-2005-0041207 A | 5/2005 |
| WO | 2013/042920 A2 | 3/2013 |

*Primary Examiner* — Chi H Pham
*Assistant Examiner* — Soon-Dong D Hyun
(74) *Attorney, Agent, or Firm* — Jefferson IP Law, LLP

(57) ABSTRACT

A method for transmitting a data packet in a transmitting apparatus in a wireless communication system is provided. The method includes receiving first feedback information including buffer status information indicating information related to a status of a buffer included in a receiving apparatus from the receiving apparatus, determining a number of first data packets to be transmitted to the receiving apparatus based on the buffer status information, determining a number of second data packets which is identical to at least one of the number of first data packets based on a data packet loss rate for each of a plurality of paths, and encoding the determined number of first data packets and the determined number of second data packets and transmitting encoded first data packets and encoded second data to the receiving apparatus through each of the plurality of paths.

36 Claims, 11 Drawing Sheets

(56) References Cited

U.S. PATENT DOCUMENTS

| | | | |
|---|---|---|---|
| 2012/0093150 A1* | 4/2012 | Kini | H04L 45/24 |
| | | | 370/389 |
| 2012/0144062 A1 | 6/2012 | Livet et al. | |
| 2012/0226802 A1* | 9/2012 | Wu | H04L 1/1825 |
| | | | 709/224 |
| 2012/0243441 A1* | 9/2012 | Reunamaki | H04L 67/14 |
| | | | 370/255 |
| 2012/0314655 A1 | 12/2012 | Xue et al. | |
| 2013/0041981 A1 | 2/2013 | Kim et al. | |
| 2013/0064198 A1* | 3/2013 | Krishnaswamy | H04W 76/025 |
| | | | 370/329 |
| 2013/0195106 A1* | 8/2013 | Calmon | H04B 7/15521 |
| | | | 370/389 |
| 2014/0269289 A1* | 9/2014 | Effros | H04L 47/38 |
| | | | 370/231 |
| 2014/0321274 A1* | 10/2014 | Gahm | H04L 47/326 |
| | | | 370/231 |
| 2015/0131535 A1* | 5/2015 | Wallentin | H04W 76/025 |
| | | | 370/329 |

* cited by examiner

METHOD AND APPARATUS FOR TRANSMITTING AND RECEIVING DATA PACKET IN WIRELESS COMMUNICATION SYSTEM

CROSS-REFERENCE TO RELATED APPLICATION(S)

This application claims the benefit under 35 U.S.C. §119 (a) of a Korean patent application filed on May 15, 2013 in the Korean Intellectual Property Office and assigned Serial No. 10-2013-0055005, the entire disclosure of which is hereby incorporated by reference.

TECHNICAL FIELD

The present disclosure relates to a method and apparatus for transmitting/receiving a data packet in a wireless communication system. More particularly, the present disclosure relates to a method and apparatus for transmitting/receiving a data packet in a wireless communication system supporting a multi-path transmission control protocol (MPTCP).

BACKGROUND

A mobile communication system has evolved to provide various high-speed large-capacity services to mobile stations (MSs). Examples of a mobile communication system include a high speed downlink packet access (HSDPA) mobile communication system, a high speed uplink packet access (HSUPA) mobile communication system, a long-term evolution (LTE) mobile communication system, an LTE-advanced (LTE-A) mobile communication system, a high rate packet data (HRPD) mobile communication system proposed by the 3rd generation partnership project 2 (3GPP2), and an institute of electrical and electronics engineers (IEEE) 802.16m mobile communication system.

Recently, the number of MSs which support a plurality of radio interfaces for a communication such as in a $3^{rd}$ generation (3G) system, a Wi-Fi system, and the like, has increased, so significance for an MPTCP in which a plurality of network links may be recognized and used in a transport layer has increased.

The MPTCP has been proposed for increasing transmission control protocol (TCP) throughput and reliability based on diversity by allowing usage of a plurality of paths per TCP session, compared to a single path TCP of the related art.

A process of transmitting/receiving a data packet based on an MPTCP in a wireless communication system of the related art will be described with reference to FIG. 1.

FIGS. 1A and 1B schematically illustrate a process of transmitting/receiving a data packet based on an MPTCP in a wireless communication system of the related art.

Referring to FIG. 1A, a transmitting apparatus 100 may transmit data packets to be transmitted to a receiving apparatus 120 through a plurality of paths. The transmitting apparatus 100 may transmit a data packet #9, a data packet #8, a data packet #6, and a data packet #4 among the data packet #9, the data packet #8, a data packet #7, the data packet #6, a data packet #5, and the data packet #4 as the data packets to be transmitted to the receiving apparatus 120 through a path #1 110 among two paths, and transmit the data packet #1 and the data packet #5 through a path #2 130 to the receiving apparatus 120 through a path #2 130 among the two paths.

Referring to FIG. 1B, the transmitting apparatus 100 may duplicately transmit the same data packet through the two paths in order to prevent loss of the data packets to be transmitted. That is, the transmitting apparatus 100 may transmit the data packet #7, the data packet #5, the data packet #9, the data packet #8, the data packet #6, and the data packet #4 to the receiving apparatus 120 through the path #1 110, and may transmit the data packet #7 and the data packet #5 as a part of data packets which have been transmitted through the path #1 110 to the receiving apparatus 120 through the path #2 130.

In this case, even though the data packets which have been transmitted through the path #2 130 are lost, the receiving apparatus 120 may receive all data packets through the path #1 110, so the receiving apparatus 120 may successfully perform a decoding operation.

In the wireless communication system supporting the MPTCP, TCP throughput may decrease due to data packet loss which may occur in each path. For this reason, there are out-of-ordered data packets if data packet loss occurs, so a TCP window size decreases.

In the wireless communication system supporting the MPTCP, qualities of paths are different one another, so a transmission delay for a data packet may occur. If the transmission delay for the data packet occurs, a decoding delay for the data packet also occurs, so data throughput decreases.

Accordingly, in the wireless communication system supporting the MPTCP, there is a need for a method of effectively transmitting/receiving a data packet by considering a characteristic of each path and a problem which may occur in each path.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for transmitting/receiving a data packet in a wireless communication system supporting a multi-path transmission control protocol (MPTCP).

Another aspect of the present disclosure is to provide a method and apparatus for transmitting/receiving a data packet in a wireless communication system supporting an MPTCP by applying an adaptive random linear coding scheme to the MPTCP.

Another aspect of the present disclosure is to provide a method and apparatus for transmitting/receiving a data packet in a wireless communication system supporting an MPTCP thereby preventing data packet loss.

Another aspect of the present disclosure is to provide a method and apparatus for transmitting/receiving a data packet in a wireless communication system supporting an MPTCP thereby preventing a data packet transmission delay.

Another aspect of the present disclosure is to provide a method and apparatus for transmitting/receiving a data packet in a wireless communication system supporting an MPTCP thereby increasing transmission control protocol (TCP) throughput.

Another aspect of the present disclosure is to provide a method and apparatus for transmitting/receiving a data packet in a wireless communication system supporting an MPTCP thereby preventing a receiving buffer blocking situation.

In accordance with an aspect of the present disclosure, a method for transmitting a data packet in a transmitting apparatus in a wireless communication system is provided. The method includes receiving first feedback information including buffer status information indicating information related to a status of a buffer included in a receiving apparatus from the receiving apparatus, determining a number of first data packets to be transmitted to the receiving apparatus based on the buffer status information, determining a number of second data packets which is identical to at least one of the number of first data packets based on a data packet loss rate for each of a plurality of paths, encoding the determined number of first data packets and the determined number of second data packets, and transmitting encoded first data packets and encoded second data to the receiving apparatus through each of the plurality of paths.

In accordance with another aspect of the present disclosure, a method for receiving a data packet in a receiving apparatus in a wireless communication system is provided. The method includes transmitting first feedback information including buffer status information indicating information related to a status of a buffer included in the receiving apparatus to a transmitting apparatus, receiving at least one data packet from the transmitting apparatus through a plurality of paths, and decoding the at least one data packet, wherein the at least one data packet includes at least one of a first data packet and a second data packet, a number of first data packets is determined based on the buffer status information, a number of second data packets is determined based on a data packet loss rate for each of the plurality of paths, and the second data packet is identical to at least one of the determined number of first data packets.

In accordance with another aspect of the present disclosure, a transmitting apparatus in a wireless communication system is provided. The transmitting apparatus includes a receiver configured to receive first feedback information including buffer status information indicating information related to a status of a buffer included in a receiving apparatus from the receiving apparatus, a controller configured to determine a number of first data packets to be transmitted to the receiving apparatus based on the buffer status information, and determine a number of second data packets which is identical to at least one of the number of first data packets based on a data packet loss rate for each of a plurality of paths, and a transmitter configured to encode the determined number of first data packets and the determined number of second data packets and transmit encoded first data packets and encoded second data to the receiving apparatus through each of the plurality of paths.

In accordance with another aspect of the present disclosure, a receiving apparatus in a wireless communication system is provided. The receiving apparatus includes a transmitter configured to transmit first feedback information including buffer status information indicating information related to a status of a buffer included in the receiving apparatus to a transmitting apparatus, a receiver configured to receive at least one data packet from the transmitting apparatus through a plurality of paths, and a decoder configured to decode the at least one data packet, wherein the at least one data packet includes at least one of a first data packet and a second data packet, a number of first data packets is determined based on the buffer status information, a number of second data packets is determined based on a data packet loss rate for each of the plurality of paths, and the second data packet is identical to at least one of the determined number of first data packets.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
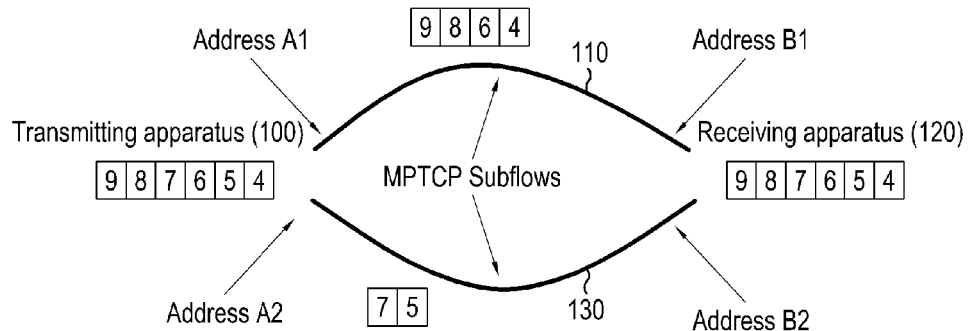
FIGS. 1A and 1B schematically illustrate a process of transmitting/receiving a data packet based on an multi-path transmission control protocol (MPTCP) in a wireless communication system according to the related art.
Figure 1B:
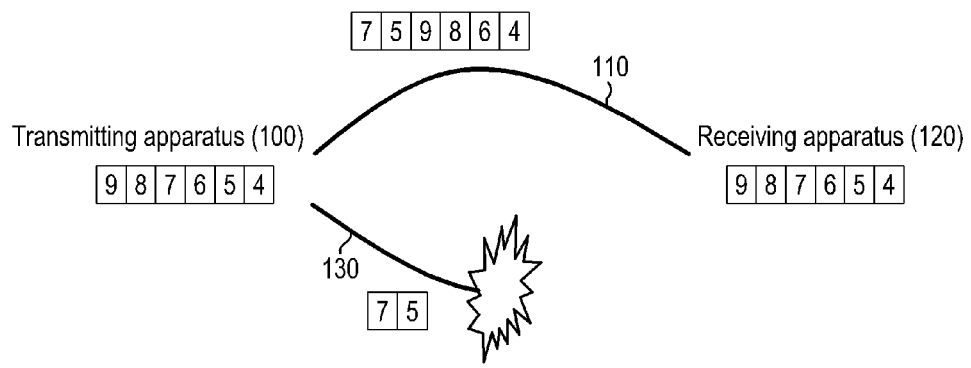

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

An embodiment of the present disclosure proposes a method and apparatus for transmitting/receiving a data packet in a wireless communication system supporting a multi-path transmission control protocol (MPTCP).

An embodiment of the present disclosure proposes a method and apparatus for transmitting/receiving a data packet in a wireless communication system supporting an MPTCP by applying an adaptive random linear coding scheme to the MPTCP.

An embodiment of the present disclosure proposes a method and apparatus for transmitting/receiving a data packet in a wireless communication system supporting an MPTCP thereby preventing data packet loss.

An embodiment of the present disclosure proposes a method and apparatus for transmitting/receiving a data packet in a wireless communication system supporting an MPTCP thereby preventing a data packet transmission delay.

An embodiment of the present disclosure proposes a method and apparatus for transmitting/receiving a data packet in a wireless communication system supporting an MPTCP thereby increasing transmission control protocol (TCP) throughput.

An embodiment of the present disclosure proposes a method and apparatus for transmitting/receiving a data packet in a wireless communication system supporting an MPTCP thereby preventing a receiving buffer blocking situation.

A method and apparatus proposed in various embodiments of the present disclosure may be applied to any of various communication systems such as a long term evolution (LTE) system, an LTE-advanced (LTE-A) system, a high speed downlink packet access (HSDPA) mobile communication system, a high speed uplink packet access (HSDPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) mobile communication system, an evolved packet system (EPS), a mobile internet protocol (Mobile IP) system, and/or the like.

For example, a wireless communication system proposed in an embodiment of the present disclosure may be a wireless communication system which supports an MPTCP.

A structure of a wireless communication system supporting an MPTCP according to an embodiment of the present disclosure will be described with reference to FIG. 2.

Figure 2:
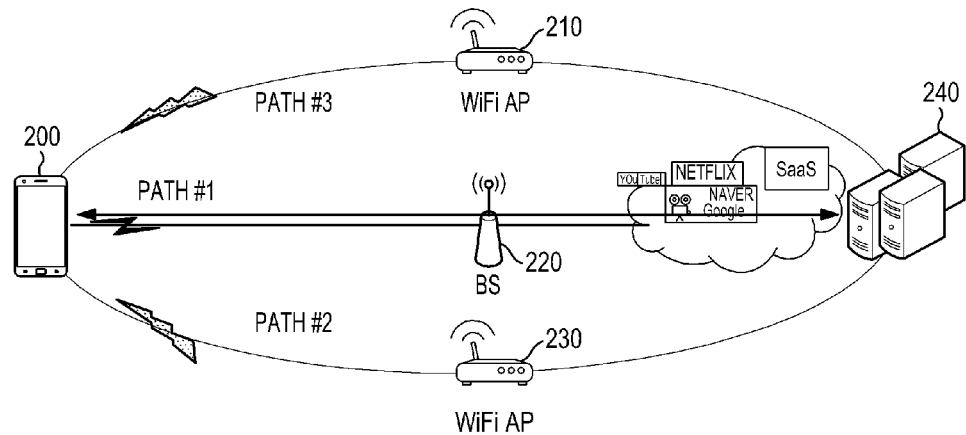
FIG. 2 schematically illustrates a structure of a wireless communication system supporting an MPTCP according to an embodiment of the present disclosure.

FIG. 2 schematically illustrates a structure of a wireless communication system supporting an MPTCP according to an embodiment of the present disclosure.

Referring to FIG. 2, the wireless communication system includes a mobile station (MS) 200, a node #1 210, a node #2 220, and a node #3 230 such as a wireless-fidelity (Wi-Fi) access point (AP), a base station (BS), and the like, and a server 240 of an internet network.

If the MPTCP is supported, the MS 200 and the server 240 may transmit/receive a data packet through a plurality of paths which are generated by the node #1 210, the node #2 220, and the node #3 230. In this wireless communication system, the plurality of paths are used so throughput and reliability may be increased compared to a case in which a single path transmission control protocol (TCP) is used.

However, in the wireless communication system, data packet loss and a transmission delay due to a multiple path on data packet transmission/reception are not considered, so various problems may occur. A problem which occurs in a case that data packet loss due to a multiple path on data packet transmission/reception is not considered will be described with reference to FIG. 3, and a problem which occurs in a case that a transmission delay due to a multiple path on data packet transmission/reception is not considered will be described with reference to FIG. 4.

An example of a process of transmitting/receiving a data packet based on an MPTCP in a wireless communication system of the related art will be described with reference to FIG. 3.

Figure 3:
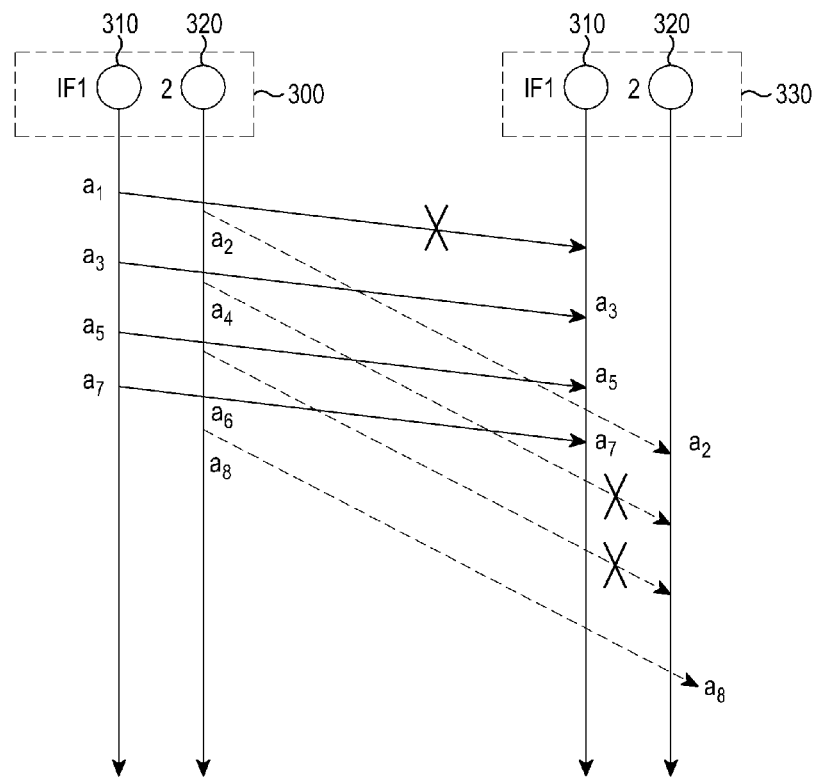
FIG. 3 schematically illustrates an example of a process of transmitting/receiving a data packet based on an MPTCP in a wireless communication system according to the related art.

FIG. 3 schematically illustrates an example of a process of transmitting/receiving a data packet based on an MPTCP in a wireless communication system according to the related art.

Referring to FIG. 3, the wireless communication system includes a transmitting apparatus 300 and a receiving apparatus 330. The transmitting apparatus 300 and the receiving apparatus 330 perform a communication using a path #1 310 and a path #2 320, respectively. That is, the transmitting apparatus 300 transmits data packets "$a_1$, $a_3$, $a_5$, $a_7$" using the path #1 310, and transmits data packets "$a_2$, $a_4$, $a_6$, $a_8$" using the path #2 320.

If data packet loss occurs in at least one of the path #1 310 and the path #2 320, the receiving apparatus 330 may not receive all data packets which are transmitted from the transmitting apparatus 300, so an order of received data packets is abnormal. So, the receiving apparatus 330 may not perform a normal data packet processing. For example, in a case that the receiving apparatus 330 does not receive the data packet "$a_1$" in the path #1 310 due to data packet loss, even though the receiving apparatus 330 receives all of the data packets "$a_3$, $a_5$, $a_7$", the receiving apparatus 330 may not perform a data packet decoding operation. Similarly, if the receiving apparatus 330 does not receive the data packets "$a_4$, $a_6$" in the path #2 320 due to data packet loss, the receiving apparatus 330 may not perform a data packet decoding operation.

As a result, if data packet loss occurs in a plurality of paths, a TCP window size decreases, so total TCP throughput may decrease.

If an MPTCP is supported, a receiving buffer blocking problem may occur. The receiving buffer blocking problem may occur since an overflow for a capacity of a receiving buffer included in a receiving apparatus occurs due to out-of-ordered data packets, and the receiving apparatus may not receive a data packet which the receiving apparatus should receive.

Another example of a process of transmitting/receiving a data packet based on an MPTCP in a wireless communication system of the related art will be described with reference to FIG. 4.

Figure 4:
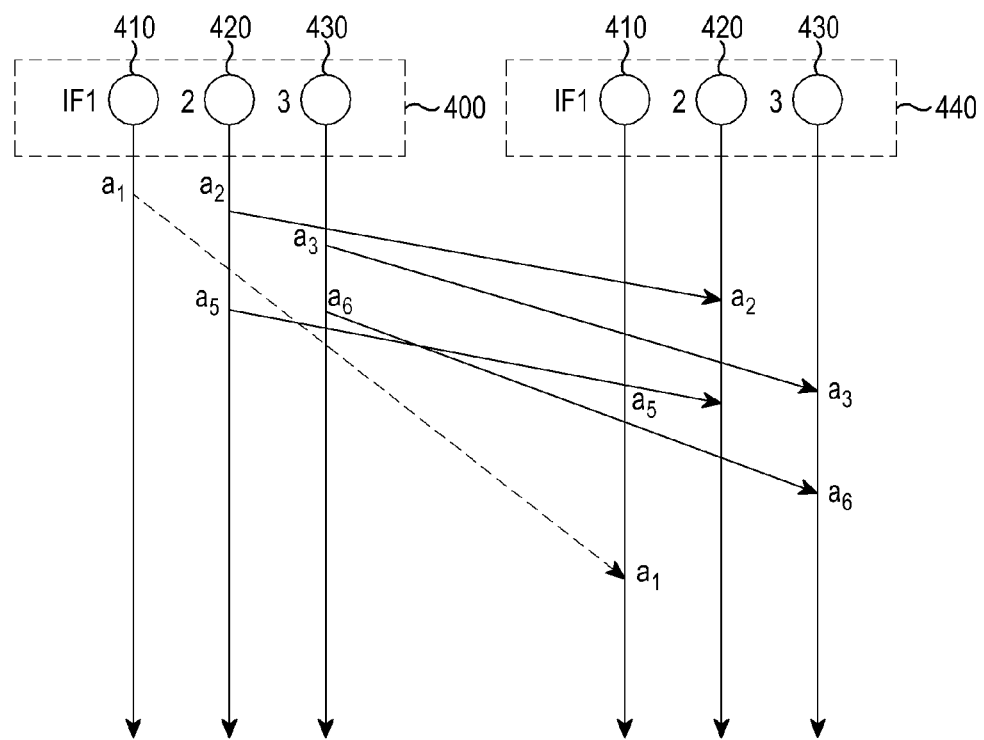
FIG. 4 schematically illustrates another example of a process of transmitting/receiving a data packet based on an MPTCP in a wireless communication system according to the related art.

FIG. 4 schematically illustrates another example of a process of transmitting/receiving a data packet based on an MPTCP in a wireless communication system of the related art.

Referring to FIG. 4, the wireless communication system includes a transmitting apparatus 400 and a receiving apparatus 440. The transmitting apparatus 400 and the receiving apparatus 440 perform a communication using a path #1 410, a path #2 420, and a path 3 430, respectively. That is, the transmitting apparatus 400 transmits a data packet "$a_1$" using the path #1 410, transmits data packets "$a_2$, $a_5$" using the path #2 420, and transmits data packets "$a_3$, $a_6$" using the path #3 430.

The three paths have different path qualities, so end-to-end delays for the three paths also have different values. In a TCP case, an order of data packets which are received in a receiving side should be accurate. If a difference of delay time for the data packets occurs, there is a need for re-ordering the data packets. However, if the re-ordering operation for the data packets is performed, there is a need for additional time, so a latency problem occurs due to this.

In FIG. 4, if the path #1 410 has the worst quality, the data packets "$a_2$", "$a_3$", "$a_5$", and "$a_6$" through the path #2 420 and the path #3 430 may be received prior to the data packet "$a_1$" through the path #1 410 in the receiving apparatus 440. As described above, in a TCP, an order of data packets is important, so there is no meaning for the data packets "$a_2$", "$a_3$", "$a_5$", and "$a_6$" if the data packet "$a_1$" is not received. Even though the data packets "$a_2$", "$a_3$", "$a_5$", and "$a_6$" are received, the receiving apparatus 440 stores the data packets "$a_2$", "$a_3$", "$a_5$", and "$a_6$" without an additional process until the receiving apparatus 440 receives the data packet "$a_1$". In this case, data packet processing is delayed, so a total performance decreases.

If a size of a buffer of the receiving apparatus 440 for storing data packets is small, overflow for the buffer occurs due to out-of-ordered data packets, so the receiving apparatus 440 may not receive desired data packets and use an advantage of an MPTCP in which data packets may be transmitted/received at a high speed. So, there is a need for a method of transmitting/receiving data packets without delay and throughput decrease by using the advantage of the MPTCP.

Accordingly, an embodiment of the present disclosure proposes a method and apparatus for transmitting a data packet using an adaptive random linear coding (ARLC) method in a wireless communication system supporting an MPTCP, thereby resolving delay and performance decrease due to data packet loss, enhancing throughput, and increasing reliability.

The ARLC method is a method in which a data packet to be transmitted is encoded using a random linear network coding (RLNC) scheme. The RLNC scheme is a scheme in which a data packet to be transmitted is encoded by applying a linear encoding coefficient to the data packet to be transmitted, and may be used in a specific network node such as an intermediate node (e.g., a node between an MS and a server of an internet network), and the like in a wireless communication system. The linear encoding coefficient may be randomly selected from among a plurality of preset linear encoding coefficients.

For example, a data packet which is encoded according to the RLNC scheme may be expressed as Equation (1).

$$\begin{pmatrix} y_1 \\ y_2 \\ \cdots \\ y_n \end{pmatrix} = \begin{pmatrix} c_{1,1}, c_{1,2}, \cdots, c_{1,m} \\ c_{2,1}, \cdots, c_{2,m} \\ \\ c_{n,1}, \cdots, c_{n,m} \end{pmatrix} \begin{pmatrix} x_1 \\ x_2 \\ \cdots \\ x_m \end{pmatrix} \quad \text{Equation (1)}$$

In Equation (1), "$x_1, x_2, \ldots, x_m$" denote data symbols included in a data packet to be transmitted, "$c_{1,1}, c_{1,2}, \ldots, c_{1,m}$", "$c_{2,1}, \ldots, c_{2,m}$", ..., "$c_{n,1}, \ldots c_{n,m}$" denote linear encoding factors which are applied to each of network codes, and "$y_1, y_2, \ldots, y_n$" denote encoded data symbols.

Meanwhile, a network coding (NC) rank denotes the number of columns included in an encoding matrix including encoded vectors which are stored in a receiving apparatus. For example, if the receiving apparatus receives a data packet "a"+a data packet "b"+a data packet "c", an NC rank may be expressed as "rank(1, 1, 1)=1". If the receiving apparatus receives the data packet "a"+a data packet "2b"+a data packet "3c" after receiving the data packet "a"+the data packet "b"+a data packet "c", the NC rank may be expressed as $$\operatorname{rank}\begin{pmatrix} 1, 1, 1 \\ 1, 2, 3 \end{pmatrix} = 2,$$

and it may be determined that the NC rank is increased by 1.

An embodiment of the present disclosure will be described below.

An inner structure of an ARLC-MPTCP control apparatus according to an embodiment of the present disclosure will be described with reference to FIG. 5.

Figure 5:
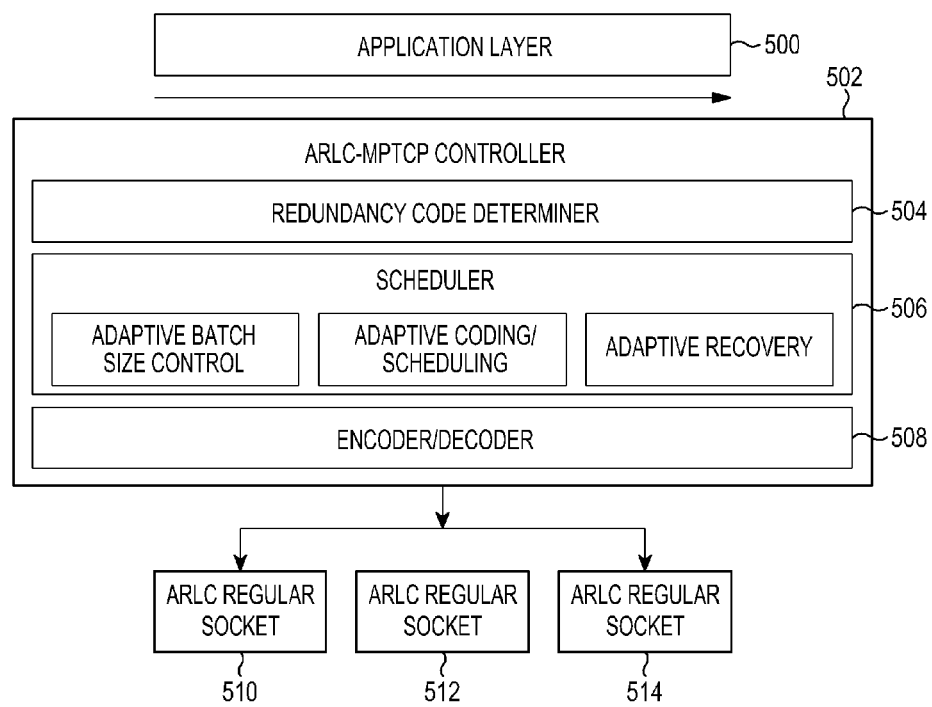
FIG. 5 schematically illustrates an inner structure of an adaptive random linear coding (ARLC)-MPTCP control apparatus according to an embodiment of the present disclosure.

FIG. 5 schematically illustrates an inner structure of an ARLC-MPTCP control apparatus according to an embodiment of the present disclosure.

Referring to FIG. 5, the ARLC-MPTCP control apparatus may be located at an NC-MPTCP layer as a sub-layer of an application layer 500, and performs an interface operation between the NC-MPTCP layer proposed in an embodiment of the present disclosure and other layer.

The ARLC-MPTCP control apparatus includes an ARLC-MPTCP controller 502, a redundancy code determiner 504, a scheduler 506, an encoder/decoder 508, and a plurality of ARLC regular sockets 510, 512, and 514.

The ARLC-MPTCP controller 502 controls an overall operation of the ARLC-MPTCP control apparatus (e.g., an operation of a transmitting apparatus proposed in an embodiment of the present disclosure) by controlling the redundancy code determiner 504, the scheduler 506, the encoder/decoder 508, and the plurality of ARLC regular sockets 510, 512, and 514.

The redundancy code determiner 504 estimates a data packet loss rate for each of a plurality of paths, and determines a redundancy packet data rate in order to determine the number of redundancy data packets to be additionally transmitted according to the estimated data packet loss rate for each of the plurality of paths. Here, a redundancy data packet denotes a duplicated data packet which is identical to at least one data packet to be transmitted. The data packet loss rate for each of the plurality of paths may be estimated based on feedback information received from a receiving apparatus, or may be estimated based on the number of response signals received from the receiving apparatus, and the like after the transmitting apparatus transmits a data packet. For example, a response signal is an acknowledgement (ACK) signal or a non-acknowledgement (NACK) signal.

The scheduler 506 performs an adaptive batch size control operation, an adaptive coding/scheduling operation, and an adaptive recovery operation based on the determined redundancy data packet, round-trip time (RTT) which is estimated for each of the plurality of paths, and the like. The RTT for each of the plurality of paths may be estimated based on a time at which a response signal (for example, an ACK signal, a feedback signal, and the like) is received after a data packet is transmitted, or may be estimated based on RTT information included in feedback information which is received from the receiving apparatus.

The encoder/decoder 508 encodes a data packet to be transmitted and decodes a received data packet.

The plurality of ARLC regular sockets 510, 512, and 514 are used for performing a communication with a receiving apparatus through the plurality of paths.

While the ARLC-MPTCP controller 502, the redundancy code determiner 504, the scheduler 506, the encoder/decoder 508, and the plurality of ARLC regular sockets 510, 512, and 514 are shown in FIG. 5 as separate units, it is to be understood that this is for merely convenience of description. In other words, two or more of the ARLC-MPTCP controller 502, the redundancy code determiner 504, the scheduler 506, the encoder/decoder 508, and the plurality of ARLC regular sockets 510, 512, and 514 may be incorporated into a single unit.

The adaptive batch size control operation, the adaptive coding/scheduling operation, and the adaptive recovery operation which are performed by the scheduler 506 will be described below.

(1) Adaptive Batch Size Control Operation

As described above, if a size of a buffer for storing a data packet in a receiving apparatus is small, overflow for the buffer occurs due to out-of-ordered data packets, so the receiving apparatus may not receive desired data packets and use an advantage of an MPTCP in which data packets may be transmitted/received at a high speed.

In order to address this problem, the scheduler 506 performs an adaptive batch size control operation in which a batch size is determined by considering the buffer size of the receiving apparatus. Here, a batch denotes an encoding unit of a data packet, and the batch size may denote the number of data packets which will be encoded at one time (i.e., the number of data packets to be transmitted).

If the buffer size of the receiving apparatus is 40 and the batch size is 50, the receiving apparatus may not receive all data packets to decode the received data packets. If the batch size is greater than the buffer size, the receiving apparatus becomes less-sensitive and a complexity of an encoding/decoding process which is performed in the receiving apparatus becomes increased.

So, an embodiment of the present disclosure proposes a method of effectively determining a batch size.

A process of performing an adaptive batch size control operation in a wireless communication system according to an embodiment of the present disclosure will be described with reference to FIG. 6.

Figure 6:
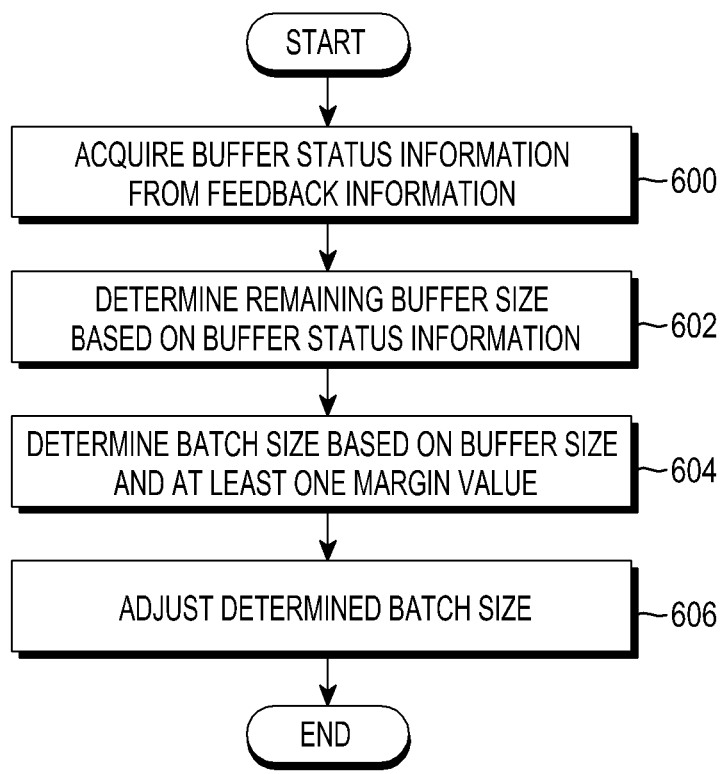
FIG. 6 schematically illustrates a process of performing an adaptive batch size control operation in a wireless communication system according to an embodiment of the present disclosure.

FIG. 6 schematically illustrates a process of performing an adaptive batch size control operation in a wireless communication system according to an embodiment of the present disclosure.

In an embodiment, an adaptive batch size control operation in FIG. 6 may be performed by a scheduler 506 in FIG. 5.

Referring to FIG. 6, the scheduler 506 acquires buffer status information for a receiving apparatus from feedback information received from the receiving apparatus at operation 600.

For example, the feedback information may be expressed as Table 1.

TABLE 1

| Batch # | Rank of received codewords | Buffer status | Measured RTT | Measured data packet loss rate of each flow | Successful decoding notification or NC-NACK |
|---|---|---|---|---|---|

In Table 1, the feedback information includes "Batch#", "Rank of received codewords", "Buffer status", "Measured RTT", "Measured data packet loss rate of each flow", and "Successful decoding notification or NC-NACK".

In Table 1, "Batch#" denotes a batch number, "Rank of received codewords" denotes rank information on a received data packet, "Buffer status" denotes buffer status information for the receiving apparatus, "Measured RTT" denotes RTT information measured in the receiving apparatus, "Measured data packet loss rate of each flow" denotes a data packet loss rate for each of a plurality of paths measured in the receiving apparatus, and "Successful decoding notification or NC-NACK" denotes information indicating that a data packet decoding on a batch unit basis in the receiving apparatus has been successfully performed or NC-NACK indicating that a specific data packet has not been received.

If data packet decoding is successfully performed at every batch in the receiving apparatus, or a data packet has not been received in the receiving apparatus, the feedback information may be received.

After acquiring the buffer status information through the feedback information, the scheduler 506 determines a remaining buffer size of the receiving apparatus based on the acquired buffer status information at operation 602. The scheduler 506 determines a buffer size which the receiving apparatus may use by considering the remaining buffer size and at least one margin value, and determines a batch size based on the determined buffer size at operation 604.

For example, the at least one margin value may include one of the following three values as ①~③ in Table 2.

TABLE 2

↑
batch
↓

① a buffer margin value which is set by considering a case that an estimated data packet loss rate is different from a real data packet loss rate
② a buffer margin value which is set by considering a re-transmitted data packet according to NC-NACK which occurs in a case that estimated data packet arrival time is different from real data packet arrival time
③ a buffer margin value which is set by considering a data packet to be transmitted while a receiving apparatus performs a decoding operation
a part that a data packet is currently stored In Table 2, the buffer margin value ① denotes a buffer margin value which is set by considering a case that an estimated data packet loss rate is different from a real data packet loss rate, the buffer margin value ② denotes a buffer margin value which is set by considering a re-transmitted data packet according to NC-NACK which occurs in a case that estimated data packet arrival time is different from real data packet arrival time, and the buffer margin value ③ denotes a buffer margin value which is set by considering a data packet to be transmitted while a receiving apparatus performs a decoding operation.

It will be understood that the batch size may be determined corresponding to a remaining part except for a part in which a data packet is stored and a part according to at least one of the buffer margin values ① to ③ from a buffer of a receiving apparatus.

If the at least one buffer margin value includes the buffer margin values ② and ③, and a sum of the buffer margin values ② and ③ is greater than a total buffer size, the scheduler 506 increases a redundancy data packet without considering the buffer margin value ③ thereby minimizing the buffer margin value ②.

The scheduler 506 adjusts the determined batch size by considering a complexity in the receiving apparatus at operation 606. The complexity in the receiving apparatus may be determined based on a decoding performance of the receiving apparatus, and the like, and information on the decoding performance of the receiving apparatus (e.g., how many data packets may be decoded or how large of a decoding matrix may be processed) may be received from the receiving apparatus upon an initial setup process.

Although FIG. 6 illustrates a process of performing an adaptive batch size control operation in a wireless communication system according to an embodiment of the present disclosure, various changes could be made to FIG. 6. For example, although shown as a series of operations, various operations in FIG. 6 could overlap, occur in parallel, occur in a different order, or occur multiple times.

(2) Adaptive Coding/Scheduling Operation

The adaptive coding/scheduling operation may be performed after the adaptive batch size control operation is performed. That is, the adaptive coding/scheduling operation may be performed after the batch size is determined.

A process of performing an adaptive coding/scheduling operation in a wireless communication system according to an embodiment of the present disclosure will be described with reference to FIG. 7.

Figure 7:
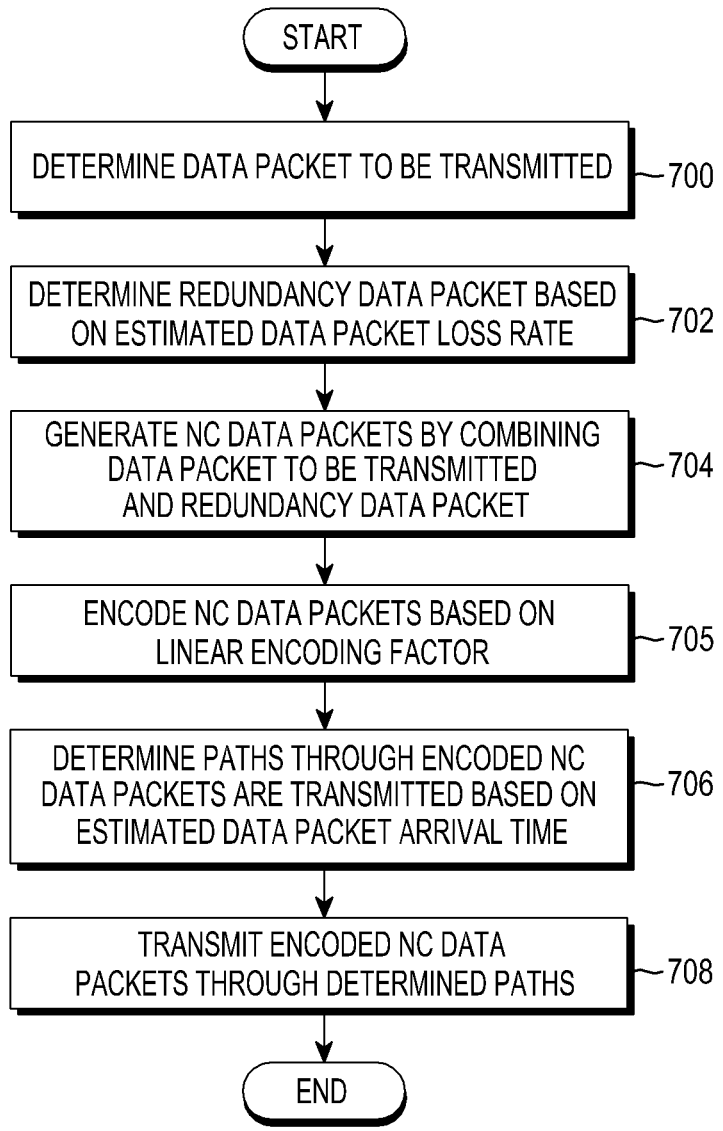
FIG. 7 schematically illustrates a process of performing an adaptive coding/scheduling operation in a wireless communication system according to an embodiment of the present disclosure.

FIG. 7 schematically illustrates a process of performing an adaptive coding/scheduling operation in a wireless communication system according to an embodiment of the present disclosure.

In an embodiment, the process of performing the adaptive coding/scheduling operation in the FIG. 7 may be performed by a scheduler 506 in FIG. 5.

Referring to FIG. 7, the scheduler 506 determines a data packet to be transmitted based on a batch size at operation 700. That is, the scheduler 506 determines the number of data packets to be transmitted corresponding to the batch size.

The scheduler 506 determines a redundancy data packet based on a data packet loss rate for each of a plurality of estimated paths at operation 702. The scheduler 506 generates NC data packets by combining the data packet to be transmitted and the redundancy data packet at operation 704.

If a buffer size of a receiving apparatus is 100, the batch size is 20, and a redundancy ratio is 10%, a total of 22 NC data packets including 20 data packets corresponding to the batch size and 2 redundancy data packets may be generated (20*(1+0.1)=22).

The scheduler 506 encodes the generated NC data packets based on a linear encoding factor which is randomly selected from among a plurality of linear encoding factors at operation 705. The scheduler 506 determines paths through the encoded NC data packets will be transmitted based on estimated data packet arrival time at operation 706. The scheduler 506 transmits the encoded NC data packets through the determined paths at operation 708.

The adaptive coding/scheduling operation is for determining a redundancy data packet through accurate data packet loss rate estimation, and may be performed by periodically reflecting a data packet loss rate which changes on a time-varying network environment on a batch unit basis.

Although FIG. 7 illustrates a process of performing an adaptive coding/scheduling operation in a wireless communication system according to an embodiment of the present disclosure, various changes could be made to FIG. 7. For example, although shown as a series of operations, various operations in FIG. 7 could overlap, occur in parallel, occur in a different order, or occur multiple times.

(3) Adaptive Recovery Operation

If an error which is greater than an estimated data packet loss rate occurs, a receiving apparatus requests to re-transmit a related number of NC data packets to a transmitting apparatus by generating NC-NACK to transmit the NC-NACK to the transmitting apparatus. The NC data packets to be re-transmitted have the smallest data packet loss rate, and should be transmitted to the receiving apparatus through a path having a small delay. In an embodiment of the present disclosure, an adaptive recovery operation may be performed, and a process of performing an adaptive recovery operation in a wireless communication system according to an embodiment of the present disclosure will be described with reference to FIG. 8.

Figure 8:
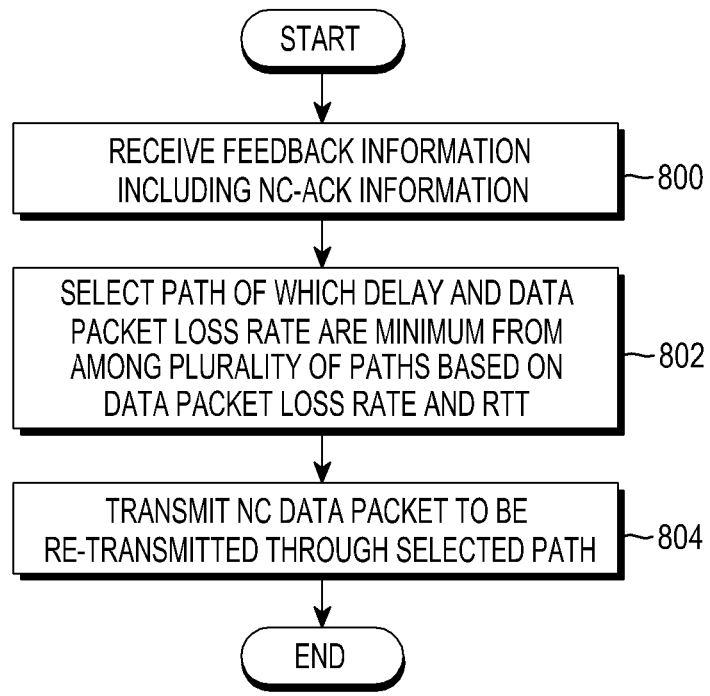
FIG. 8 schematically illustrates a process of performing an adaptive recovering operation in a wireless communication system according to an embodiment of the present disclosure.

FIG. 8 schematically illustrates a process of performing an adaptive recovering operation in a wireless communication system according to an embodiment of the present disclosure.

In an embodiment, the process of performing the adaptive recovering operation in the FIG. 8 may be performed by a scheduler 506 in FIG. 5.

Referring to FIG. 8, the scheduler 506 receives feedback information including NC-NACK from a receiving apparatus at operation 800. The scheduler 506 selects a path of which a delay and a data packet loss rate are minimum from among a plurality of paths based on a data packet loss rate and RTT included in the feedback information at operation 802. The scheduler 506 transmits an NC data packet to be re-transmitted through the selected path to the receiving apparatus at operation 804. If the process in FIG. 8 is performed, a diversity gain according to a use of an MPTCP may be acquired.

Although FIG. 8 illustrates a process of performing an adaptive recovering operation in a wireless communication system according to an embodiment of the present disclosure, various changes could be made to FIG. 8. For example, although shown as a series of operations, various operations in FIG. 8 could overlap, occur in parallel, occur in a different order, or occur multiple times.

A process in which the aforementioned three operations, i.e., an adaptive batch size control operation in FIG. 6, an adaptive coding/scheduling operation in FIG. 7, and an adaptive recovery operation in FIG. 8 are performed will be briefly described with reference to FIG. 9. For convenience, the ARLC-MPTCP control apparatus is called a transmitting apparatus.

Figure 9:
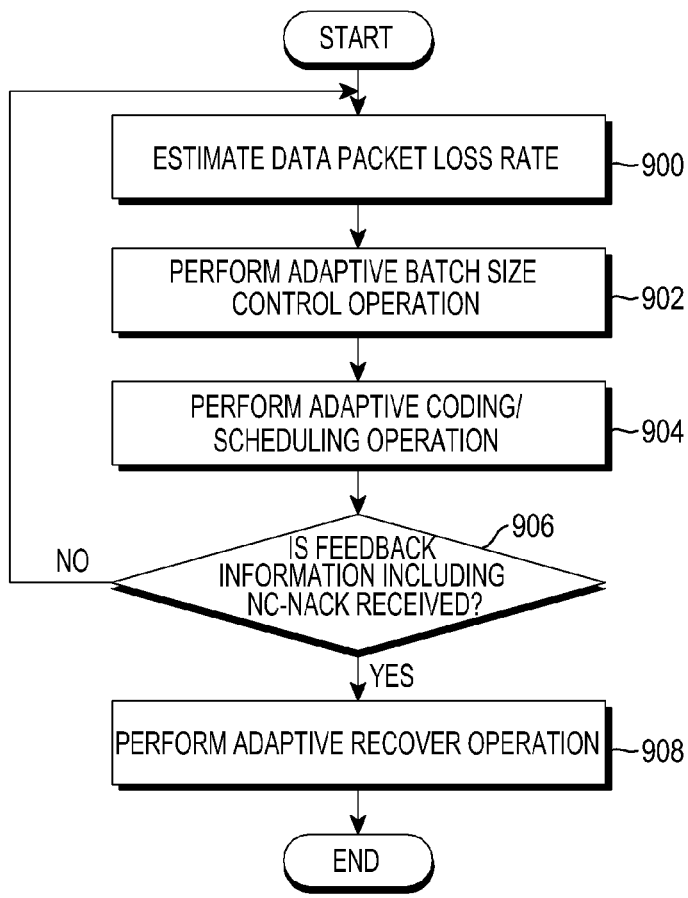
FIG. 9 schematically illustrates a scheduling process of a transmitting apparatus according to an embodiment of the present disclosure.

FIG. 9 schematically illustrates a scheduling process of a transmitting apparatus according to an embodiment of the present disclosure.

Referring to FIG. 9, the transmitting apparatus estimates a data packet loss rate for each of a plurality of paths at operation 900. The transmitting apparatus determines a batch size by performing an adaptive batch size control operation at operation 902. The transmitting apparatus performs an adaptive coding/scheduling operation based on the estimated data packet loss rate and batch size at operation 904. The transmitting apparatus determines whether feedback information including NC-NACK is received from a receiving apparatus at operation 906.

If the feedback information including the NC-NACK is not received, the transmitting apparatus proceeds to operation 900. If the feedback information including the NC-NACK is received, the transmitting apparatus performs an adaptive recover operation for retransmitting NC data packets which are not received in the receiving apparatus at operation 908.

Although FIG. 9 illustrates a scheduling process of a transmitting apparatus according to an embodiment of the present disclosure, various changes could be made to FIG. 9. For example, although shown as a series of operations, various operations in FIG. 9 could overlap, occur in parallel, occur in a different order, or occur multiple times.

An internal structure and an operating process of a receiving apparatus in a wireless communication system according to an embodiment of the present disclosure will be described with reference below.

An internal structure of a receiving apparatus in a wireless communication system according to an embodiment of the present disclosure will be described with reference to FIG. 10.

Figure 10:
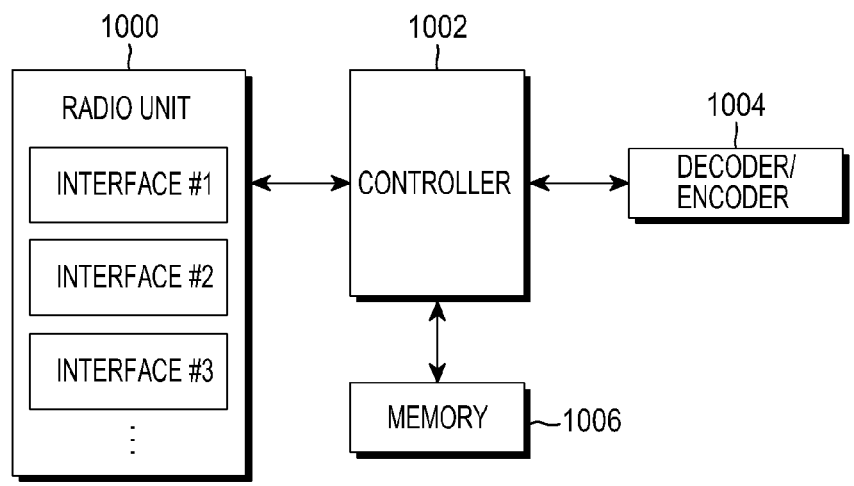
FIG. 10 schematically illustrates an internal structure of a receiving apparatus in a wireless communication system according to an embodiment of the present disclosure.

FIG. 10 schematically illustrates an internal structure of a receiving apparatus in a wireless communication system according to an embodiment of the present disclosure.

Referring to FIG. 10, the receiving apparatus includes a radio unit 1000, a controller 1002, a decoder/encoder 1004, and a memory 1006.

The radio unit 1000 includes a plurality of radio interfaces (an interface #1, an interface #2, an interface #3, and the like) for performing an NC data packet transmitting/receiving operation based on different communications formats such as Wi-Fi, LTE, and the like.

The controller 1002 may perform an operation of a receiving apparatus according to an embodiment of the present disclosure by controlling the radio unit 1000, the controller 1002, the decoder/encoder 1004, and the memory 1006.

The decoder/encoder 1004 decodes scheduling information and NC data packets which are received from a transmitting apparatus, or encodes information such as feedback information to be transmitted to a transmitting apparatus, and the like. The decoder/encoder 1004 is implemented with one physical configuration unit, and performs a decoding/encoding operation. Alternatively, the decoder/encoder 1004 is implemented with physical configuration units which are physically classified, and may separately perform a decoding operation and an encoding operation.

The memory 1006 stores information which is generated according to an operation of the receiving apparatus such as the received scheduling information, feedback information to be transmitted, and the like. The memory 1006 may include a buffer for storing a received NC data packet.

While the radio unit 1000, the controller 1002, the decoder/encoder 1004, and the memory 1006 are shown in FIG. 10 as separate units, it is to be understood that this is merely for convenience of description. In other words, two or more of the radio unit 1000, the controller 1002, the decoder/encoder 1004, and the memory 1006 may be incorporated into a single unit.

A method of receiving an NC data packet in a receiving apparatus will be described with reference to FIG. 11.

Figure 11:
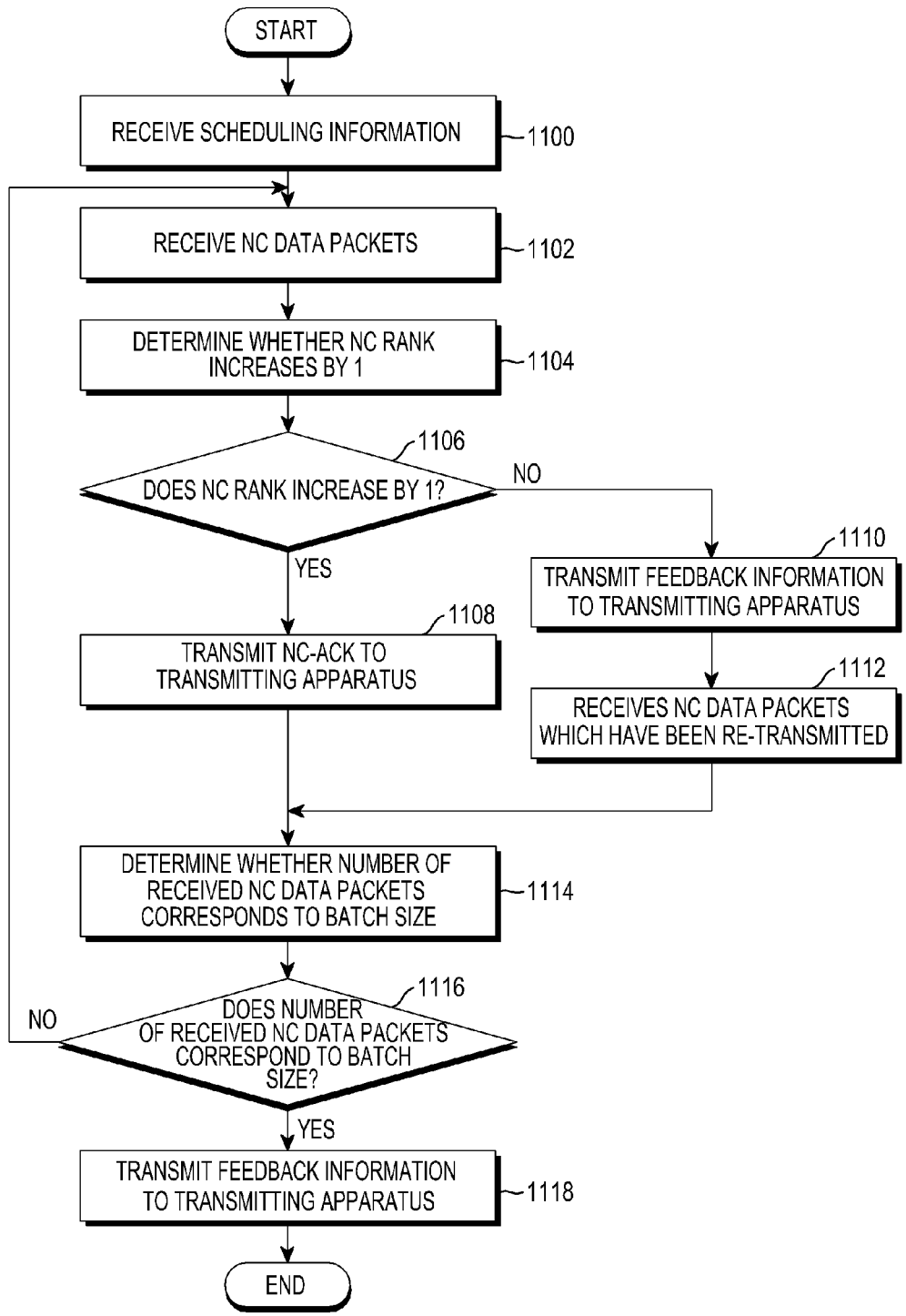
FIG. 11 schematically illustrates a process of receiving a Network Coding (NC) data packet in a receiving apparatus in a wireless communication system according to an embodiment of the present disclosure.

FIG. 11 schematically illustrates a process of receiving an NC data packet in a receiving apparatus in a wireless communication system according to an embodiment of the present disclosure.

Referring to FIG. 11, the receiving apparatus receives scheduling information from a transmitting apparatus at operation 1110. The scheduling information may include information of a batch size, a redundancy data packet, and the like. The receiving apparatus receives NC data packets through a multi path from the transmitting apparatus according to the scheduling information at operation 1102.

The receiving apparatus determines whether an NC rank increases by 1 by checking the NC rank at operation 1104. If the NC rank increases by 1 at operation 1106, the receiving apparatus transmits NC-ACK to the transmitting apparatus at operation 1108.

If the NC rank does not increase by 1 at operation 1106, the receiving apparatus continuously receives NC data packets, and transmits feedback information including NC-NACK to the transmitting apparatus if there is a data packet which is not received based on a data packet number at operation 1110. The receiving apparatus receives an NC data packet which is retransmitted from the transmitting apparatus at operation 1112.

The receiving apparatus determines whether the number of received NC data packets corresponds to a batch size at operation 1114. If the number of the received NC data packets does not correspond to the batch size at operation 1116, the receiving apparatus returns to operation 1102. If the number of the received NC data packets corresponds to the batch size at operation 1116, the receiving apparatus transmits feedback information including a decoding success indicator to the transmitting apparatus at operation 1118.

Although FIG. 11 illustrates a process of receiving an NC data packet in a receiving apparatus in a wireless communication system according to an embodiment of the present disclosure, various changes could be made to FIG. 11. For example, although shown as a series of operations, various operations in FIG. 11 could overlap, occur in parallel, occur in a different order, or occur multiple times.

A process of transmitting/receiving an NC data packet in a wireless communication system according to an embodiment of the present disclosure will be described with reference to FIG. 12.

Figure 12:
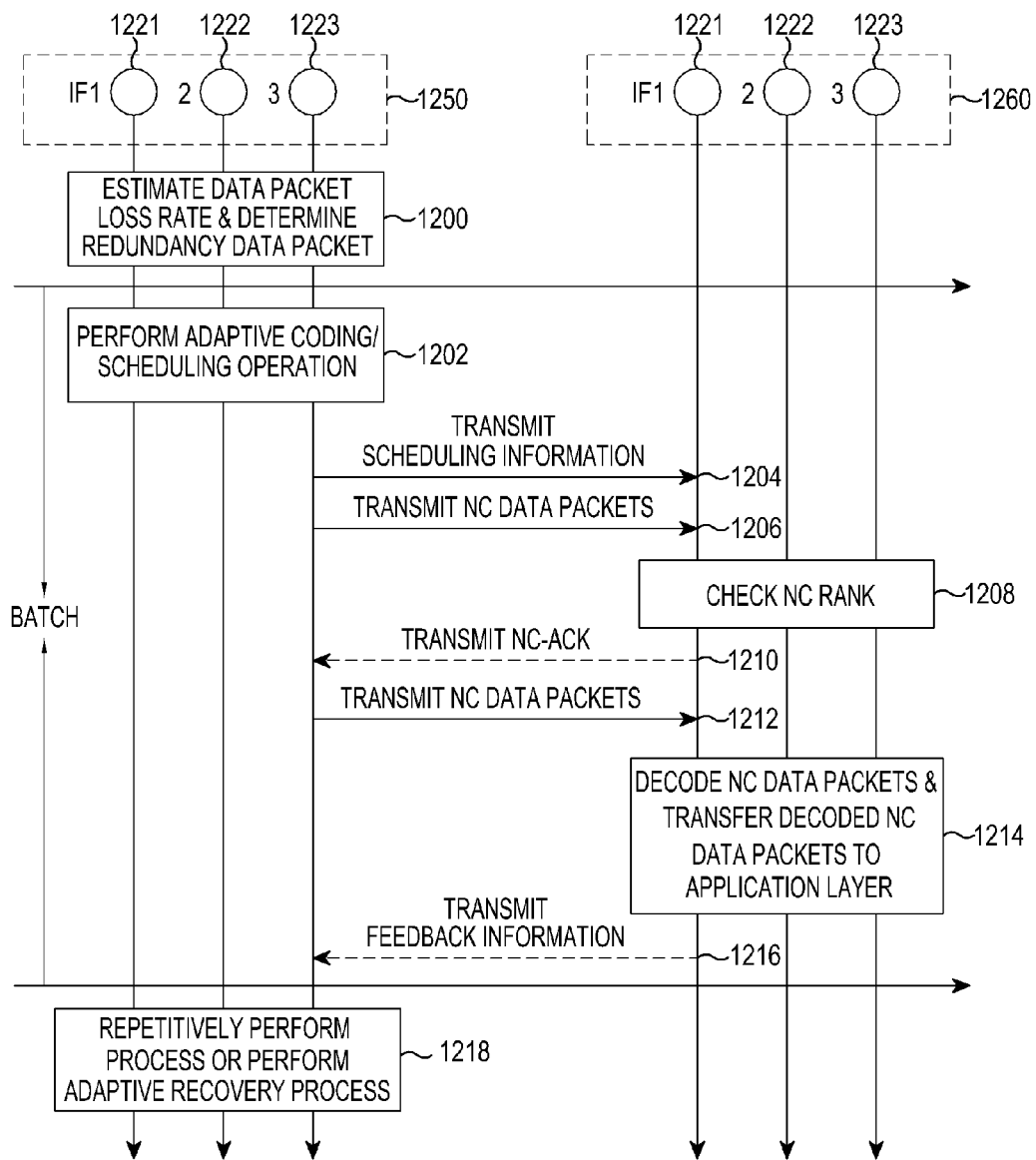
FIG. 12 schematically illustrates a process of transmitting/receiving an NC data packet in a wireless communication system according to an embodiment of the present disclosure.

FIG. 12 schematically illustrates a process of transmitting/receiving an NC data packet in a wireless communication system according to an embodiment of the present disclosure.

Referring to FIG. 12, a transmitting apparatus 1250 and a receiving apparatus 1260 perform a communication using three paths (a path #1 1221, a path #2 1222, and a path #3 1223).

The transmitting apparatus 1250 estimates a data packet loss rate for each path to determine a redundancy data packet at operation 1200. The transmitting apparatus 1250 determines a batch size through an adaptive batch size control operation, and performs an adaptive coding/scheduling operation to allocate NC data packets to be transmitted to each of the three paths at operation 1202. The transmitting apparatus 1250 transmits scheduling information to the receiving apparatus 1260 at operation 1204.

For example, the scheduling information may be expressed as Table 3.

TABLE 3

| Batch (block) # | Batch size | Packets sequence # of batch | Redundancy | Estimated RTT for each flow | Coding coefficients of all coded packets |
|---|---|---|---|---|---|

In Table 3, the scheduling information includes "Batch (block)#", "Batch size", "Packet sequence # of batch", "Redundancy", "Estimated RTT for each flow", and "Coding coefficients of all coded packets".

In Table 3, "Batch (block)#" denotes a batch number, "Batch size" denotes a batch size, "Packet sequence # of batch" denotes a data packet number within a related batch, "Redundancy" denotes information on a redundancy data packet, "Estimated RTT for each flow" denotes estimated RTT for each path, and "Coding coefficients of all coded packets" denotes information on an encoding factor which is used when a related data packet is encoded. If the scheduling information in Table 3 includes information on all encoding factors for all batches to be transmitted, the scheduling information does not be retransmitted.

After receiving the scheduling information, the receiving apparatus 1260 receives NC data packets from the transmitting apparatus 1250 according to a related batch size at operation 1206. Each of the NC data packets received from the transmitting apparatus 1250 may be expressed as Table 4.

TABLE 4

| NC-indicator | Batch # | Coding coefficient | Data |
|---|---|---|---|

In Table 4, an NC data packet includes "NC-indicator", "Batch#", "Coding coefficient", and "Data".

In Table 4, "NC-indicator" denotes information indicating that a related data packet is an NC data packet (for example, "NC-indicator" may be set to 0 or 1), "Batch#" denotes a batch number, "Coding coefficient" denotes information on an encoding factor which is used when a related data packet is encoded, and "Data" denotes a data packet.

The receiving apparatus 1260 determines whether an NC rank increases by 1 by checking the NC rank at operation 1208. If the NC rank increases by 1, the receiving apparatus 1260 transmits NC-ACK to the transmitting apparatus 1250 thereby informing that related NC data packets have been received at operation 1210. For example, the NC-ACK may be expressed as Table 5.

TABLE 5

| Rank of received codewords | Batch # |
|---|---|

In Table 5, the NC-ACK includes "Rank of received codewords", and "Batch#".

In Table 5, "Rank of received codewords" denotes rank information which has been checked in the receiving apparatus 1260, and "Batch#" denotes a batch number.

After receiving the NC-ACK, the transmitting apparatus 1250 transmits NC data packets to the receiving apparatus 1260 at operation 1212. The receiving apparatus 1260 determines whether NC data packets corresponding to a buffer size are received. If the NC data packets corresponding to the buffer size are received, the receiving apparatus 1260 performs a decoding operation for the NC data packets, and transfers the decoded NC data packets to an application layer at operation 1214. For example, in a case that the batch size is 20 and the NC rank is 20, the receiving apparatus 1260 decodes 20 received NC data packets and transmits the decoded 20 NC data packets to the application layer thereby preventing a receiving buffer blocking situation.

If the received NC data packets do not correspond to the buffer size, the receiving apparatus 1260 additionally receives NC data packets. If NC data packets corresponding to a related batch size are received and decoded, the receiving apparatus 1260 includes information indicating that the NC data packets corresponding to the related batch size have been successfully decoded into the feedback information to transmit the feedback information to the transmitting apparatus 1250 at operation 1216. The feedback information may further include a batch number, rank information, buffer status information, RTT information, a data packet loss rate, and the like.

If all processes which are performed on a batch unit basis are ended, the transmitting apparatus 1250 and the receiving apparatus 1260 may repetitively perform a process which is similar to a process in operation 1218 or perform an adaptive recovery process. The recovery operation process is a process in which the receiving apparatus 1260 transmits feedback information including NC-NACK to the transmitting apparatus 1250 upon detecting NC data packets which the receiving apparatus 1260 does not receive thereby the NC data packets which the receiving apparatus 1260 does not receive are re-transmitted.

Although FIG. 12 illustrates a process of transmitting/receiving an NC data packet in a wireless communication system according to an embodiment of the present disclosure, various changes could be made to FIG. 12. For example, although shown as a series of operations, various operations in FIG. 12 could overlap, occur in parallel, occur in a different order, or occur multiple times.

An example of a process of transmitting/receiving an NC data packet in a wireless communication system according to an embodiment of the present disclosure will be described with reference to FIG. 13.

Figure 13:
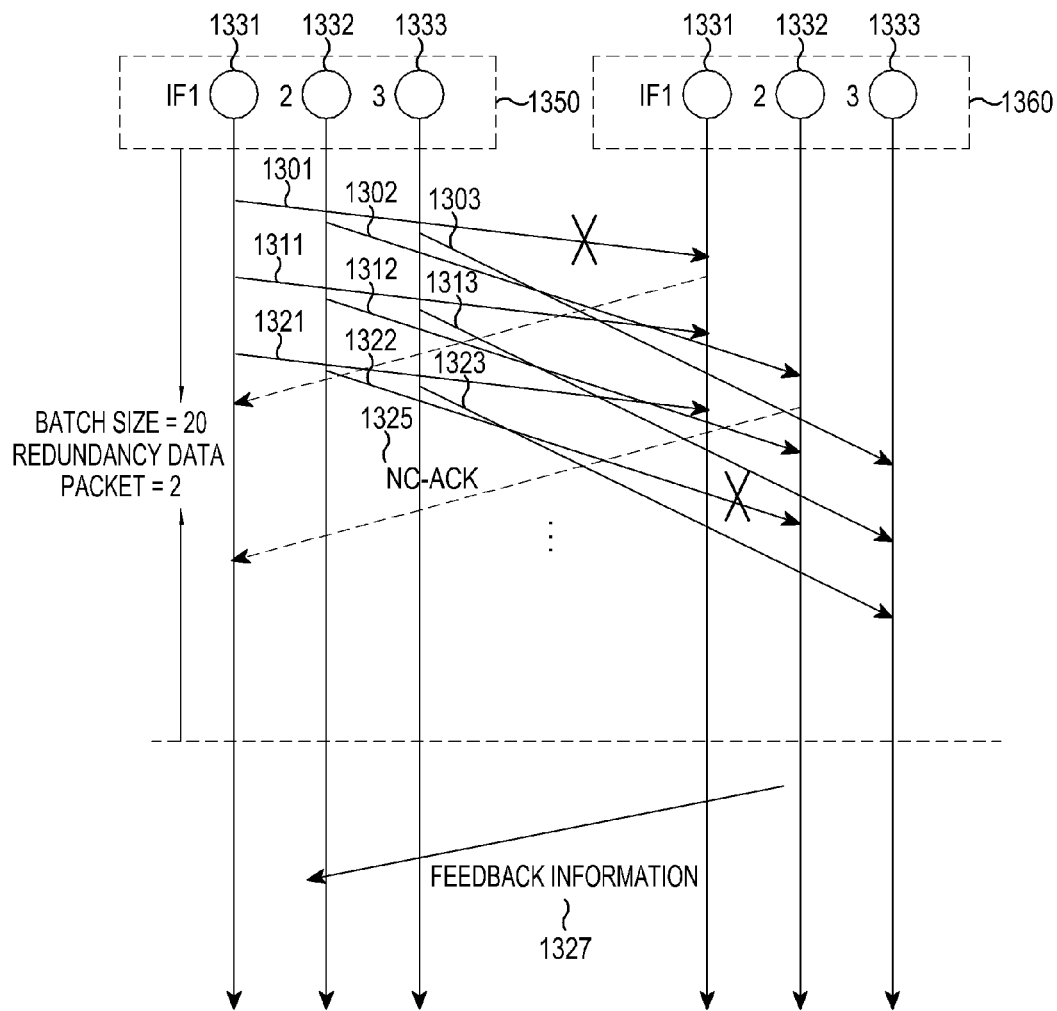
FIG. 13 schematically illustrates an example of a process of transmitting/receiving an NC data packet in a wireless communication system according to an embodiment of the present disclosure.

FIG. 13 schematically illustrates an example of a process of transmitting/receiving an NC data packet in a wireless communication system according to an embodiment of the present disclosure.

Referring to FIG. 13, a transmitting apparatus 1350 and a receiving apparatus 1360 perform a communication using three paths (a path #1 (1331), a path #2 (1332), and a path #3 (1333)). If a batch size is 20 and a redundancy data packet rate is 10%, the number of data packets to be transmitted may be determined as 20, and the number of redundancy data packets may be determined as 2. That is, the number of NC data packets may be 22.

In a case that a data packet "$a_1$" 1301, data packets "$a_1$"+"$a_2$" 1311, and a data packet "$a_2$" 1321 are sequentially transmitted through the first path 1331, even though the data packet "$a_1$" 1301 is not received in the receiving apparatus 1360 due to data packet loss, the receiving apparatus 1360 may acquire the data packet "$a_1$" 1301 and the data packet "$a_2$" 1321, so there is no problem of performing a decoding operation.

Similarly, in a case that a data packet "$a_5$" 1303, a data packet "$a_6$" 1313, and data packets "$a_5$"+"$a_6$" 1323 are sequentially transmitted through the third path 1333, even though the data packet "$a_6$" 1313 is not received in the receiving apparatus 1360 due to data packet loss, the receiving apparatus 1360 may acquire the data packet "$a_5$" 1303 and the data packet "$a_6$" 1313, so there is no problem of performing a decoding operation.

In a case that the receiving apparatus 1360 receives and decodes the data packet "$a_3$" 1302, the data packet "$a_3$"+the data packet "$a_4$" 1312, and the data packet "$a_3$" 1322 which are sequentially transmitted on the path #2 1332, there is no problem of performing a decoding operation on the path #1 1331 and the path #3 1333. In that case, the receiving apparatus 1360 transmits NC-ACK 1325 to the transmitting apparatus 1350.

If it is impossible for the receiving apparatus 1360 to perform a decoding operation using only received NC data packets, the receiving apparatus 1360 re-receives the NC data packets which are not received thereby successfully performing the decoding operation.

The receiving apparatus 1360 transmits feedback information 1327 indicating that a decoding operation for related NC data packets has been successfully performed to the transmitting apparatus 1350 thereby performing a transmitting/receiving operation for NC data packets corresponding to the next batch size.

A method and apparatus proposed in an embodiment of the present disclosure may be used in a wireless network environment supporting an MPTCP.

For example, a method and apparatus according to an embodiment of the present disclosure may be used for a communication through a plurality of paths between a proxy server which is located between a base station (BS) (or an access point) and an internet network and a mobile station (MS) (or between the BS or an access node and the MS). In this case, the proxy server allocates traffic to a path which is less busy among the plurality of the paths thereby decreasing resource congestion.

In the wireless network environment, a multi-path diversity gain may be acquired through data packet transmission/reception in which delay time and a data packet loss rate are considered, and throughput may be increased according to an enhancement of resource utilization. Further, stability and reliability according to data packet transmission/reception may increased by fast switching from a failed link to another link.

The transmitting apparatus may be implemented to include a transmitter, a controller, a receiver, and a storage unit.

The controller controls the overall operation of the transmitting apparatus. More particularly, the controller controls the transmitting apparatus to perform an operation related to an operation of transmitting/receiving a data packet. The operation related to the operation of transmitting/receiving the data packet is performed in the manner described with reference to FIG. 2, and FIGS. 5 to 13 and a description thereof will be omitted herein.

The storage unit stores a program, various data, and the like necessary for an operation of the transmitting apparatus, i.e., the operation related to the operation of transmitting/receiving the data packet in FIG. 2, and FIGS. 5 to 13.

The transmitter transmits various messages, and the like to a receiver under a control of the controller. The various messages, and the like transmitted in the transmitter have been described in FIG. 2, and FIGS. 5 to 13 and a description thereof will be omitted herein.

The receiver receives various messages, and the like from the receiving apparatus under a control of the controller. The various messages, and the like received in the receiver have been described in FIG. 2, and FIGS. 5 to 13 and a description thereof will be omitted herein.

While the transmitter, the controller, the receiver, and the storage unit are described in the transmitting apparatus as separate units, it is to be understood that this is merely for convenience of description. In other words, two or more of the transmitter, the controller, the receiver, and the storage unit may be incorporated into a single unit.

Meanwhile, the receiving apparatus may be implemented to include a transmitter, a controller, a receiver, and a storage unit.

The controller controls the overall operation of the receiving apparatus. More particularly, the controller controls the receiving apparatus to perform an operation related to an operation of transmitting/receiving a data packet. The operation related to the operation of transmitting/receiving the data packet is performed in the manner described with reference to FIG. 2, and FIGS. 5 to 13 and a description thereof will be omitted herein.

The storage unit stores a program, various data, and the like necessary for an operation of the receiving apparatus, i.e., the operation related to the operation of transmitting/receiving the data packet in FIG. 2, and FIGS. 5 to 13.

The transmitter transmits various messages, and the like to a transmitting apparatus under a control of the controller. The various messages, and the like transmitted in the transmitter have been described in FIG. 2, and FIGS. 5 to 13 and a description thereof will be omitted herein.

The receiver receives various messages, and the like from the transmitting apparatus under a control of the controller. The various messages, and the like received in the receiver have been described in FIG. 2, and FIGS. 5 to 13 and a description thereof will be omitted herein.

While the transmitter, the controller, the receiver, and the storage unit are described in the receiver as separate units, it is to be understood that this is merely for convenience of description. In other words, two or more of the transmitter, the controller, the receiver, and the storage unit may be incorporated into a single unit.

As is apparent from the foregoing description, an embodiment of the present disclosure enables transmission/reception of a data packet in a wireless communication system supporting an MPTCP.

An embodiment of the present disclosure enables transmission/reception of a data packet in a wireless communication system supporting an MPTCP thereby preventing data packet loss.

An embodiment of the present disclosure enables transmission/reception of a data packet in a wireless communication system supporting an MPTCP thereby preventing a packet transmission delay.

An embodiment of the present disclosure enables transmission/reception of a data packet in a wireless communication system supporting an MPTCP by applying an ARLC scheme to the MPTCP.

An embodiment of the present disclosure enables transmission/reception of a data packet in a wireless communication system supporting an MPTCP thereby increasing TCP throughput.

An embodiment of the present disclosure enables transmission/reception of a data packet in a wireless communication system supporting an MPTCP thereby preventing a receiving buffer blocking situation.

Certain aspects of the present disclosure may also be embodied as computer readable code on a computer readable recording medium. A computer readable recording medium is any data storage device that can store data, which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, RAM, a memory chip, a memory device, or a memory integrated circuit (IC), or an optically or magnetically recordable non-transitory machine-readable, e.g., computer-readable, storage medium, e.g., a compact disk (CD), a digital versatile disk (DVD), a magnetic disk, or a magnetic tape. A method and apparatus according to an embodiment of the present disclosure may be implemented by a computer or a mobile terminal that includes a controller and a memory, and the memory may be an example of a non-transitory machine-readable, e.g., computer-readable, storage medium suitable to store a program or programs including instructions for implementing various embodiments of the present disclosure.

The present disclosure may include a program including code for implementing the apparatus and method as defined by the appended claims, and a non-transitory machine-readable, e.g., computer-readable, storage medium storing the program.

An apparatus according to an embodiment of the present disclosure may receive the program from a program providing device which is connected to the apparatus via a wire or a wireless and store the program. The program providing device may include a memory for storing instructions which instruct to perform a contents protect method which has been already installed, information necessary for the contents protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting a data packet in a transmitting apparatus in a wireless communication system, the method comprising:
   receiving first feedback information including buffer status information related to a status of a buffer included in a receiving apparatus from the receiving apparatus; and
   encoding first data packets and second data packets and transmitting the encoded first data packets and the encoded second data packets to the receiving apparatus through each of a plurality of paths,
   wherein a number of the first data packets is determined based on the buffer status information, and
   wherein one of the second data packets is identical to at least one of the first data packets, and a number of the second data packets is determined based on a packet loss rate for each of the plurality of paths.

2. The method of claim 1, wherein the number of the first data packets is determined based on a usable buffer size of the receiving apparatus which is determined based on the buffer status information and a complexity according to a decoding operation of the receiving apparatus.

3. The method of claim 2, wherein the usable buffer size is determined based on the buffer status information, and at least one of a first buffer margin value which is for a case that the packet loss rate for each of the plurality of paths is different from a real packet loss rate, a second buffer margin value which is for a case that time at which one of the first data packets arrives is different from estimated arrival time, and a third buffer margin value which is set by considering re-transmission time for the one of the first data packets.

4. The method of claim 1,
   wherein the packet loss rate for each of the plurality of paths is estimated based on information related to the packet loss rate for each of the plurality of paths estimated in the receiving apparatus, and
wherein the information related to the packet loss rate for each of the plurality of paths estimated in the receiving apparatus is included in the first feedback information.

5. The method of claim 1, wherein the encoding of the first data packets and the second data packets and transmitting the encoded first data packets and the encoded second data packets to the receiving apparatus through each of the plurality of paths comprises:
estimating data packet arrival time for each of the plurality of paths based on round-trip time (RTT) for each of the plurality of paths;
allocating each of the first data packets and the second data packets to each of the plurality of paths based on the data packet arrival time for each of the plurality of paths; and
encoding each of the first data packets and the second data packets and transmitting the encoded data packet at the allocated path.

6. The method of claim 1, wherein the encoding of the first data packets and the second data packets and transmitting the encoded first data packets and the encoded second data packets to the receiving apparatus through each of the plurality of paths comprises:
encoding each of the first data packets and the second data packets based on an encoding factor; and
transmitting the first data packets, the second data packets, and information related to the encoding factor to the receiving apparatus.

7. The method of claim 1, further comprising:
selecting, upon receiving second feedback information including information related to a data packet which is not received in the receiving apparatus from the receiving apparatus, a path which has a minimum delay time and a minimum packet loss rate from among the plurality of paths based on the packet loss rate for each of the plurality of paths included in the second feedback information and round-trip time (RTT) for each of the plurality of paths; and
re-transmitting the data packet which is not received in the receiving apparatus through the selected path.

8. The method of claim 1, further comprising:
encoding, upon receiving third feedback information indicating that the first data packets are decoded from the receiving apparatus, third data packets and fourth data packets and transmitting the encoded third data packets and the encoded fourth data packets to the receiving apparatus through each of the plurality of paths,
wherein a number of the third data packets and a number of the fourth data packets are determined based on buffer status information and the packet loss rate for each of the plurality of paths included in the third feedback information.

9. The method of claim 1, further comprising:
transmitting scheduling information to the receiving apparatus,
wherein the scheduling information includes at least one of information related to the number of the first data packets, information related to the first data packets, information related to the second data packets, information related to round-trip time (RTT) for each of the plurality of paths estimated in the receiving apparatus, and information related to an encoding factor which is used for encoding each of the first data packets and the second data packets.

10. A method for receiving a data packet in a receiving apparatus in a wireless communication system, the method comprising:
transmitting first feedback information including buffer status information related to a status of a buffer included in the receiving apparatus to a transmitting apparatus;
receiving data packets from the transmitting apparatus through a plurality of paths; and
decoding the data packets,
wherein the data packets include first data packets and second data packets, a number of the first data packets is determined based on the buffer status information, a number of the second data packets is determined based on a packet loss rate for each of the plurality of paths, and one of the second data packets is identical to at least one of the first data packets.

11. The method of claim 10, wherein the number of the first data packets is determined based on a usable buffer size of the receiving apparatus corresponding to the buffer status information and a complexity according to a decoding operation of the receiving apparatus.

12. The method of claim 11, wherein the usable buffer size is determined based on the buffer status information, and at least one of a first buffer margin value which is for a case that the packet loss rate for each of the plurality of paths is different from a real packet loss rate, a second buffer margin value which is for a case that time at which one of the first data packets arrives is different from estimated arrival time, and a third buffer margin value which is set by considering re-transmission time for the one of the first data packets.

13. The method of claim 10,
wherein the packet loss rate for each of the plurality of paths is measured in the receiving apparatus, and
wherein the packet loss rate for each of the plurality of paths is included in the first feedback information.

14. The method of claim 10, wherein each of the first data packets and the second data packets is allocated to each of the plurality of paths to be transmitted from the transmitting apparatus based on round-trip time (RTT) for each of the plurality of paths.

15. The method of claim 10, wherein the decoding of the at least one data packet comprises:
receiving information related to an encoding factor which is used for encoding the data packets; and
decoding the data packets based on the information related to the encoding factor.

16. The method of claim 10,
wherein the receiving of the data packets comprises:
receiving scheduling information from the transmitting apparatus; and
receiving the data packets based on the scheduling information, and
wherein the scheduling information includes at least one of information related to the number of the first data packets, information related to the first data packets, information related to the second data packets, information related to round-trip time (RTT) for each of the plurality of paths estimated in the transmitting apparatus, and information related to an encoding factor which is used for encoding each of the first data packets and the second data packets.

17. The method of claim 16, further comprising:
determining whether there is a data packet which is not received in the receiving apparatus based on the scheduling information;

transmitting, if there is the data packet which is not received in the receiving apparatus, second feedback information including information related to the data packet which is not received in the receiving apparatus to the transmitting apparatus; and re-receiving the data packet which is not received in the receiving apparatus through a path which is selected from among the plurality of paths, wherein the selected path is determined based on a packet loss rate for each of the plurality of paths and round-trip time (RTT) for each of the plurality of paths.

18. The method of claim 10, wherein the decoding of the data packets comprises:

transmitting, if the first data packets are decoded, third feedback information indicating that the first data packets are decoded to the transmitting apparatus; and transferring the decoded first data packets to an application layer.

19. A transmitting apparatus in a wireless communication system, the transmitting apparatus comprising:

at least one processor; and a memory communicatively coupled to the at least one processor, wherein the at least one processor configured to:

perform an operation of receiving first feedback information including buffer status information related to a status of a buffer included in a receiving apparatus from the receiving apparatus, perform an operation of encoding first data packets and second data packets, and perform an operation of transmitting the encoded first data packets and the encoded second data packets to the receiving apparatus through each of a plurality of paths, wherein a number of the first data packets is determined based on the buffer status information, and wherein one of the second data packet packets is identical to at least one of the first data packets, and a number of the second data packets is determined based on a packet loss rate for each of the plurality of paths.

20. The transmitting apparatus of claim 19, wherein the number of the first data packets is determined based on a usable buffer size of the receiving apparatus which is determined based on the buffer status information and a complexity according to a decoding operation of the receiving apparatus.

21. The transmitting apparatus of claim 20, wherein the usable buffer size is determined based on the buffer status information, and at least one of a first buffer margin value which is for a case that the packet loss rate for each of the plurality of paths is different from a real packet loss rate, a second buffer margin value which is for a case that time at which one of the first data packets arrives is different from estimated arrival time, and a third buffer margin value which is set by considering re-transmission time for the one of the first data packets.

22. The transmitting apparatus of claim 19, wherein the packet loss rate for each of the plurality of paths is estimated based on information related to a packet loss rate for each of the plurality of paths estimated in the receiving apparatus, and wherein the information related to the packet loss rate for each of the plurality of paths estimated in the receiving apparatus is included in the first feedback information.

23. The transmitting apparatus of claim 19, wherein the operation of encoding the first data packets and the second data packets and transmitting the encoded first data packets and the encoded second data packets to the receiving apparatus through each of the plurality of paths comprises:

an operation of estimating packet arrival time for each of the plurality of paths based on round-trip time (RTT) for each of the plurality of paths;

an operation of allocating each of the first data packets and the second data packets to each of the plurality of paths based on the packet arrival time for each of the plurality of paths; and an operation of encoding each of the first data packets and the second data packets and transmitting the encoded data packet at an allocated path.

24. The transmitting apparatus of claim 19, wherein the operation of encoding the first data packets and the second data packets and transmitting the encoded first data packets and the encoded second data packets to the receiving apparatus through each of the plurality of paths comprises:

an operation of encoding each of the first data packets and the second data packets based on an encoding factor; and an operation of transmitting the first data packets, the second data packets, and information related to the encoding factor to the receiving apparatus.

25. The transmitting apparatus of claim 19, wherein the at least one processor is further configured to:

select a path which has minimum delay time and a minimum packet loss rate from among the plurality of paths based on a packet loss rate for each of the plurality of paths included in second feedback information including information related to a data packet which is not received in the receiving apparatus from the receiving apparatus and round-trip time (RTT) for each of the plurality of paths upon receiving the second feedback information, and re-transmit the data packet which is not received in the receiving apparatus through the selected path.

26. The transmitting apparatus of claim 19, wherein the at least one processor is further configured to:

encode third data packets and fourth data packets, and transmit the encoded third data packets and the encoded fourth data packets to the receiving apparatus through each of the plurality of paths upon receiving third feedback information indicating that the first data packets are decoded from the receiving apparatus, and wherein a number of the third data packets and a number of the fourth data packets are determined based on buffer status information and a packet loss rate for each of the plurality of paths included in the third feedback information.

27. The transmitting apparatus of claim 19, wherein the at least one processor is further configured to transmit scheduling information to the receiving apparatus, and wherein the scheduling information includes at least one of information related to the number of the first data packets, information related to the first data packets, information related to the second data packets, information related to round-trip time (RTT) for each of the plurality of paths estimated in the transmitting apparatus, and information related to an encoding factor which is used for encoding each of the first data packets and the second data packets.

28. A receiving apparatus in a wireless communication system, the receiving apparatus comprising:

at least one processor; and a memory communicatively coupled to the at least one processor, wherein the at least one processor configured to:
perform an operation of transmitting first feedback information including buffer status information indicating information related to a status of a buffer included in the receiving apparatus to a transmitting apparatus,
perform an operation of receiving data packets from the transmitting apparatus through a plurality of paths, and
perform an operation of decoding the data packets,
wherein the data packets include first data packets and second data packets, a number of the first data packets is determined based on the buffer status information, a number of the second data packets is determined based on a packet loss rate for each of the plurality of paths, and one of the second data packets is identical to at least one of the first data packets.

29. The receiving apparatus of claim 28, wherein the number of the first data packets is determined based on a usable buffer size of the receiving apparatus corresponding to the buffer status information and a complexity according to a decoding operation of the receiving apparatus.

30. The receiving apparatus of claim 29, wherein the usable buffer size is determined based on the buffer status information, and at least one of a first buffer margin value which is for a case that the packet loss rate for each of the plurality of paths is different from a real packet loss rate, a second buffer margin value which is for a case that time at which one of the first data packets arrives is different from estimated arrival time, and a third buffer margin value which is set by considering re-transmission time for the one of the first data packets.

31. The receiving apparatus of claim 28,
wherein the packet loss rate for each of the plurality of paths is measured in the receiving apparatus, and
wherein the packet loss rate for each of the plurality of paths is included in the first feedback information.

32. The receiving apparatus of claim 28, wherein each of the first data packets and the second data packets is allocated to each of the plurality of paths to be transmitted from the transmitting apparatus based on round-trip time (RTT) for each of the plurality of paths.

33. The receiving apparatus of claim 28, wherein the operation of decoding the at least one data packet comprises:
an operation of receiving information related to an encoding factor which is used for encoding the data packets; and
an operation of decoding the data packets based on the information related to the encoding factor.

34. The receiving apparatus of claim 28,
wherein the operation of receiving the data packets comprises:
an operation of receiving scheduling information from the transmitter; and
an operation of receiving the data packets based on the scheduling information, and
wherein the scheduling information includes at least one of information related to the number of the first data packets, information related to the first data packets, information related to the second data packets, information related to round-trip time (RTT) for each of the plurality of paths estimated in the transmitting apparatus, and information related to an encoding factor which is used for encoding each of the first data packets and the second data packets.

35. The receiving apparatus of claim 34, wherein the at least one processor is further configured to:
determine whether there is a data packet which is not received in the receiving apparatus based on the scheduling information;
transmit, if there is the data packet which is not received in the receiving apparatus, second feedback information including information related to the data packet which is not received in the receiving apparatus to the transmitting apparatus, and re-receive the data packet which is not received in the receiving apparatus through a path which is selected from among the plurality of paths, and
wherein the selected path is determined based on the packet loss rate for each of the plurality of paths and round-trip time (RTT) for each of the plurality of paths.

36. The receiving apparatus of claim 28, wherein the operation of encoding the at least one data packet comprises:
an operation of transmitting third feedback information indicating that the first data packets are decoded to the transmitting apparatus if the first data packets are decoded; and
an operation of transferring the decoded first data packets to an application layer.

* * * * *